Patented Sept. 12, 1933

1,926,059

UNITED STATES PATENT OFFICE 1,926,059

OXIDATION OF SECONDARY ALCOHOLS

Earl L. Pelton and Chester C. Kennedy, Midland, Mich., assignors to The Dow Chemical Company, Midland, Mich., a corporation of Michigan No Drawing. Application October 2, 1931
Serial No. 566,580

12 Claims. (Cl. 260—116)

The object of the present invention is to provide a method for preparing aliphatic carboxylic acids by the oxidation of secondary alcohols in which the acid formed contains one carbon atom less than the alcohol employed.

We have found that, when a secondary alcohol having the general formula;

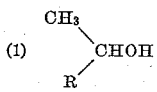

in which R represents an alkyl group, is reacted with a substantially anhydrous alkali metal hydroxide under conditions hereinafter particularly described, splitting off of methane takes place simultaneously with the oxidation of the alcohol to produce in good yield the alkali metal salt of the corresponding acid having one less carbon atom than the alcohol, according to the equation;—

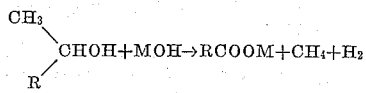

in which M represents an alkali metal. From the salt the corresponding acid may be prepared in known manner.

Examples of the foregoing are as follows:—

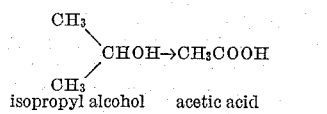
isopropyl alcohol    acetic acid

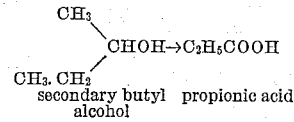
secondary butyl    propionic acid
alcohol

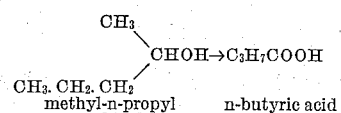
methyl-n-propyl    n-butyric acid
carbinol

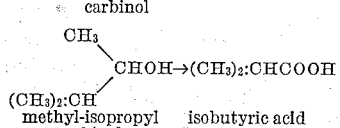
methyl-isopropyl    isobutyric acid
carbinol

In general our improved method consists in introducing the alcohol as vapor or directly as liquid into a fused body of alkali metal hydroxide substantially free from water at a temperature between about 200° and 325° C. In order to maintain the reaction mass in a suitably fluid condition, a mixture of sodium and potassium hydroxides may be used. The proportions of such mixture may be varied considerably, but preferably should be kept between the molecular ratios of

and

Advantageously, a mixture consisting of about equal parts by weight of the two hydroxides may be employed, such mixture approximating the composition having the minimum melting point, and also permitting the reaction mass to remain fluid at the temperatures suitable for the reaction as the salt of the organic acid product accumulates. The hydroxide is preferably to be anhydrous, or nearly so, since the presence of water appears to retard the reaction, but the presence of a small amount of water, e. g. as much as 5 per cent, or thereabouts, may be permissible without unduly hindering the reaction.

The following detailed examples describe specific applications of the invention by way of illustration. Such examples constitute, however, but two of the various ways in which the principle of the invention may be utilized, and are not to be understood as implying any limitation upon the scope of the invention.

EXAMPLE 1

Acetic acid from isopropyl alcohol

A mixture of substantially anhydrous alkali metal hydroxides in molecular proportion of approximately

was placed in a horizontal tubular iron reactor provided with mechanism to rotate the same and with means for agitiating the contents, and heated to a temperature of approximately 290° C. During the subsequent reaction the temperature was maintained as closely as practicable at that point. Isopropyl alcohol of purity of 98-99 per cent was introduced slowly into one end of the reactor while rotating the same, while exit gases and vapors were vented continuously from the opposite end of the reactor. The exit gases were cooled in a condenser to separate unreacted isopropyl alcohol, and the gases leaving the condenser were scrubbed with water to remove the last amounts of alcohol. The residual gases were found to consist substantially of methane and hydrogen in about equal volumes. After 7½ hours a total of 1674 grams isopropyl alcohol had been added, of which 1004 grams were recovered unreacted from the exit gases, while 670 grams were consumed in the reaction. In the reaction product 95.3 per cent of the alkali metal hydroxide had been reacted, such product consisting substantially of acetate and unreacted alkali practically free from carbonate. Upon acidifying and distilling a total of 614 grams acetic acid was obtained, corresponding to a yield of 93 per cent on the alcohol reacted. The recovered isopropyl alcohol was free from polymerization or decomposition products.

EXAMPLE 2

*Propionic acid from secondary butyl alcohol*

In an iron pot provided with a tight cover and a stirrer was placed 21.45 moles of a mixture of approximately equal parts by weight of KOH and NaOH, and the mixture was fused and heated to a temperature of about 290° C. While maintaining the temperature between about 290° and 300° C., 12 moles of secondary butyl alcohol (B. P. 99° C.) was gradually introduced into the melt through a feed tube during a period of 6 hours. Exit gases were continuously vented to maintain the reaction at substantially normal pressure. From the exit gases was recovered 2.08 moles unreacted alcohol, while 9.92 moles thereof was reacted. In the reaction product 44.7 per cent of the alkali metal hydroxide had been reacted. Upon acidifying and distilling 9.38 moles propionic acid was recovered, corresponding to a yield of 94.8 per cent on the alcohol reacted. The presence of acids other than propionic was not detected and no carbonates were formed in the reaction.

By proceeding similarly other secondary alcohols having the general Formula (1) as aforesaid may be converted to a salt of the corresponding carboxylic acid containing one less carbon atom substantially without the formation of polymerization or condensation products such as higher alcohols, or of decomposition products other than the salt of the desired acid. The alkali metal salt of the acid may be recovered directly from the reaction product by crystallization methods, for instance, according to the one disclosed in a co-pending application of C. J. Strosacker et al., Serial No. 539,780, filed May 25, 1931, now Patent No. 1,866,329 in which the separation of sodium acetate from a mixture of sodium acetate, potassium acetate and alkali metal hydroxide is specifically described. The acid may be prepared from the reaction product or from the separated salt in any of the known ways, for instance by acidifying with a mineral acid, e. g. sulphuric, phosphoric or hydrochloric acid, and distilling off the organic acid.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:—

1. In a method of oxidizing a secondary alcohol having the formula

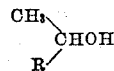

to produce a carboxylic acid containing one less carbon atom and having the formula R.COOH, in which formulas R represents an alkyl group, the step which consists in reacting such alcohol with a fused mixture of potassium and sodium hydroxides at a temperature between 200° and 325° C.

2. In a method of oxidizing isopropyl alcohol to produce acetic acid, the step which consists in reacting said alcohol with a fused mixture of potassium and sodium hydroxides at a temperature between 200° and 325° C.

3. In a method of oxidizing secondary butyl alcohol to produce propionic acid, the step which consists in reacting said alcohol with a fused mixture of potassium and sodium hydroxides at a temperature between 200° and 325° C.

4. In a method of oxidizing a secondary alcohol having the formula

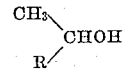

to produce a carboxylic acid containing one less carbon atom and having the formula R.COOH, in which formulas R represents an alkyl group, the steps which consist in reacting such alcohol with a fused mixture of potassium and sodium hydroxides at a temperature between 200° and 325° C., and recovering the alkali metal salt of the acid from the reaction product.

5. In a method of oxidizing isopropyl alcohol to produce acetic acid, the steps which consist in reacting said alcohol with a fused mixture of potassium and sodium hydroxides at a temperature between 200° and 325° C., and recovering alkali metal acetate from the reaction product.

6. In a method of oxidizing secondary butyl alcohol to produce propionic acid, the steps which consist in reacting said alcohol with a fused mixture of potassium and sodium hydroxides at a temperature between 200° and 325° C., and recovering alkali metal propionate from the reaction product.

7. The method of making an aliphatic carboxylic acid which comprises reacting a secondary alcohol having the formula

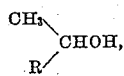

in which R represents an alkyl group, with a fused mixture of potassium and sodium hydroxides at a temperature between 200° and 325° C., acidifying the reaction product and separating the aliphatic acid having one less carbon atom than the alcohol employed.

8. The method of making acetic acid which comprises reacting isopropyl alcohol with a fused mixture of potassium and sodium hydroxides at a temperature between 200° and 325° C., acidifying the reaction product and distilling off the acetic acid formed.

9. The method of making propionic acid which comprises reacting secondary butyl alcohol with a fused mixture of potassium and sodium hydroxides at a temperature between 200° and 325° C., acidifying the reaction product and distilling off the propionic acid formed.

10. The method which comprises reacting a secondary alcohol having the formula

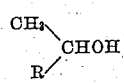

in which R represents an alkyl group, with a fused mixture of potassium and sodium hydroxides in molecular proportion of the former to the latter between $$\frac{1}{3} \text{ and } \frac{2}{1}$$

at a temperature between about 290° and about 300° C., whereby is produced an alkali metal salt of the carboxylic acid containing one less carbon atom and having the formula R.COOH.

11. The method which comprises reacting isopropyl alcohol with a fused mixture of potassium and sodium hydroxides in molecular proportion of the former to the latter between $$\frac{1}{3} \text{ and } \frac{2}{1}$$

at a temperature between about 290° and about 300° C., whereby an alkali metal acetate is produced.

12. The method which comprises reacting secondary butyl alcohol with a fused mixture of potassium and sodium hydroxides in molecular proportion of the former to the latter between $$\frac{1}{3} \text{ and } \frac{2}{1}$$

at a temperature between about 290° and about 300° C., whereby an alkali metal propionate is produced.

EARL L. PELTON.
CHESTER C. KENNEDY.